Dec. 29, 1964     C. W. COCHRAN     3,163,712
WIRING CLIP HAVING A STUD ENGAGEMENT MEANS
Original Filed Jan. 26, 1960
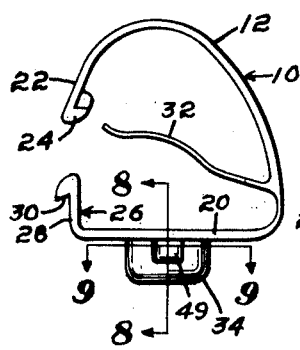
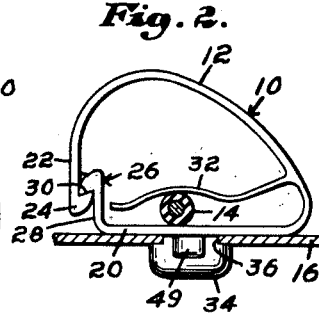
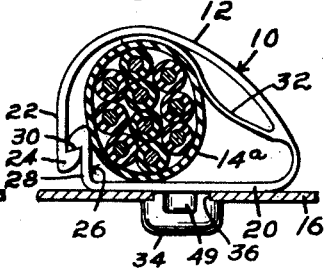
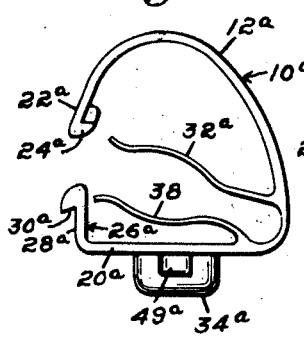
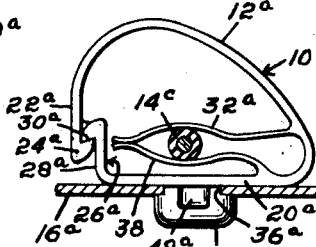
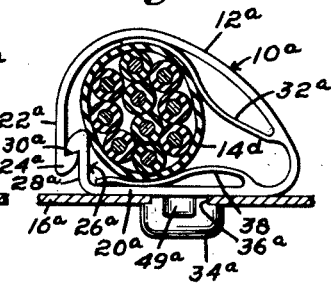
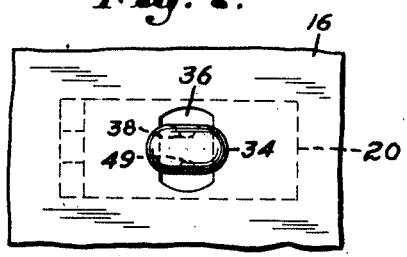
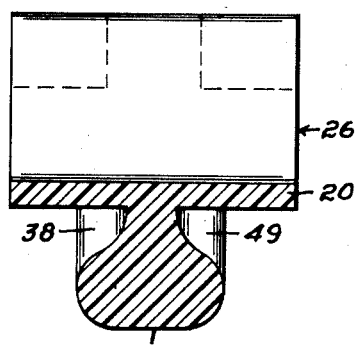
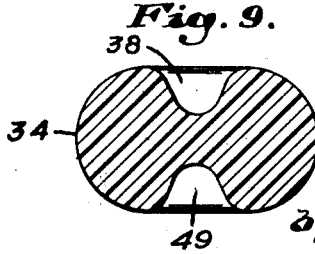
*Inventor:*
Clarence W. Cochran (deceased),
by Lois Cochran, Administratrix
by Gordon Needham
Atty.

United States Patent Office 3,163,712
Patented Dec. 29, 1964

3,163,712
WIRING CLIP HAVING A STUD ENGAGEMENT MEANS
Clarence W. Cochran, deceased, late of Belmont, Mass., by Lois F. Cochran, administratrix, Belmont, Mass., assignor to United-Carr Incorporated, a corporation of Delaware
Original application Jan. 26, 1960, Ser. No. 4,783, now Patent No. 3,090,826, dated May 21, 1963. Divided and this application Apr. 2, 1963, Ser. No. 270,509
3 Claims. (Cl. 174—164)

This invention relates to fastening devices and more particularly to a wiring fastener adapted to secure a plurality of wires to a support.

This application is a divisional of application Serial No. 4,783, filed January 26, 1960 and issued on May 21, 1963, as U.S. Patent No. 3,090,826.

Recent developments in the automotive industry have disclosed a definite need for improved types of wiring and tubing clips which will secure a plurality of wires in assembly and having integral fastening means for attaching the clip to a flanged support.

The object of the invention is to provide an improved wiring clip or the like adapted to retain one or a plurality of wires in assembly and having integral fastening means for securing the clip to a support.

A further object of the invention is to provide a wiring clip having interlocking wiring engaging portions which are adapted to encircle a wire harness or the like after the clip has been positioned on a support.

Another object of the invention is to provide a wiring clip having positive locking features to retain a wire harness or the like to a support.

Other objects of the invention will, in part, be obvious and will, in part, appear hereinafter.

In the drawings:

FIG. 1 is a view in side elevation showing a wiring fastener;

FIG. 2 is a view in side elevation of the wiring fastener shown in FIG. 1 in closed position with one wire in assembly;

FIG. 3 is a view in elevation partly in section of the wiring fastener shown in FIG. 1 engaged to a support and in closed position retaining a plurality of wires in assembly;

FIG. 4 is a view in elevation of a modified form of the fastener shown in FIG. 1 having two retaining arms;

FIG. 5 is a view in elevation of the modified form of the fastener of FIG. 4 in a closed position retaining a wire in assembly;

FIG. 6 is a view in elevation partly in section of the modified form of the fastener of FIG. 4 in a closed position retaining a plurality of wires in assembly;

FIG. 7 is a bottom plan view of the fastener shown in FIG. 2;

FIG. 8 is a section taken on line 8—8 of FIG. 1; and

FIG. 9 is a view in section taken on line 9—9 of FIG. 1.

Referring to the drawings, there is illustrated a fastener 10 which is formed from a resilient plastic having a wire retaining portion 12 enclosing a wire 14 in assembly on a support 16.

The fastener 10 comprises a one piece device having an arcuate wiring encircling portion 12 extending from one end of a base 20 in such a manner that a loop is formed with the distal end 22 of the wire encircling portion having a locking member 24 for a purpose to be described hereinafter. Extending from the other end of the base 20 and at substantially right angles thereto is a flange engaging portion 26 having on its outer surface 28 and spaced from the base 20 a shoulder 30 adapted for cooperate snap engagement with the locking member 24 providing an adjustable fastener member.

A tensioning arm 32 integrally formed with the wire encircling portion 12 extends substantially parallel to the base 20 so as to lie within the area enclosed by the base 20 and the wire encircling portion 12 in such a manner as to retain the wire 14 in abutting relationship with the base 20. As illustrated in FIG. 3 the tensioning arm 32 will flex upwardly to retain tension on a large wiring harness 14a so as to be universal with respect to a wide variety of wiring needs. Extending downwardly from the middle lateral surface of the base 20 is an oval stud 34 having a major and minor axis for axial insertion within an aperture 36 formed in the panel 16 and adapted for retention therein by rotation whereby the walls at the aperture 36 enter into biting engagement with the stud 34 as shown in FIG. 3. A variation of the applicant's device is disclosed at FIGS. 4 through 6 which illustrates a second tensioning arm 38 extending from the base 20a in spaced substantially parallel relationship with the arm 32a in such a manner as to retain one wire 14 or a plurality of wires 14a between the first and second arms. The remaining parts of the fastener are identical with the fastener shown in FIGS. 1 through 3 and are identified with like numbers having an *a* appended thereto except the single wire is identified as 14c and the plurality of wires as 14d.

FIGS. 7 through 9 illustrate, the stud 34 where, in the interest of greater flexibility and holding power, cut out portions 38 and 40 are formed in the opposing lateral surfaces of the minor axis which will allow the major axis to flex slightly inward to compensate for irregularities in hole sizes within the apertured plate.

Since certain other obvious modifications may be made in this device without departing from the scope of the invention, it is intended that all matter contained herein be interpreted in an illustrative and not in a limiting sense.

What is claimed is:

1. A resilient adjustable electrically nonconductive clamping device adapted to retain a plurality of wires or the like on a support comprising a base, one end of said base being curved backwards on itself forming a loop having its distal free end formed into a locking member for cooperative snap engagement with a shoulder formed on a substantially right angular extension of the other end of said base and a tensioning arm formed integral with said loop extending within the area between said loop and said base and said tensioning arm spaced from said base and said base having a stud extending therefrom in a direction away from said loop, said stud having a major and minor axis and having longer sides on each side of said major axis and having a cutout portion formed on the extenral surface of each of said longer sides.

2. A resilient adjustable, electrically, nonconductive, unitary clamping device adapted to retain a plurality of wires or the like on a support comprising a base, one end of said base being curved backwards on itself forming a loop having its distal free end formed into a locking member for cooperative snap engagement with a shoulder formed on a substantially right angle extension of the other end of said base and a tensioning arm formed integral with said clamping device and extending within the area between said lop and said base, and said tensioning arm spaced from said base, and said base having a stud extending therefrom in a direction away from said loop, said stud having major and minor axes and having longer sides on each side of major axis and having a cutout portion formed on the external surface of each of said longer sides.

3. A resilient, adjustable, electrical, nonconductive, clamping device as set forth in claim 2 wherein a second tensioning arm is formed integral with the clamping device and extends within the area between the said loop and the said base, said tensioning arms being in spaced relationship with each other.

References Cited in the file of this patent

UNITED STATES PATENTS

| | | |
|---|---|---|
| 2,712,917 | Flora et al. | July 12, 1955 |
| 2,896,889 | Hershberger et al. | July 28, 1959 |
| 2,996,275 | Holton | Aug. 15, 1961 |
| 3,090,826 | Cochran | May 21, 1963 |

OTHER REFERENCES

F. W. Hill: "Cable Harness Clamp," IBM Technical Disclosure Bulletin, vol. 2, No. 1, June 1959, page 3.